US012158288B2

(12) United States Patent
Han et al.

(10) Patent No.: US 12,158,288 B2
(45) Date of Patent: Dec. 3, 2024

(54) LIGHT-SPLITTING REFLECTION HIGH-CONCENTRATION PHOTOVOLTAIC PHOTOTHERMAL INTEGRATED CAVITY RECEIVER

(71) Applicant: Xi'an Thermal Power Research Institute Co., Ltd, Xi'an (CN)

(72) Inventors: Wei Han, Xi'an (CN); Kangli Fu, Xi'an (CN); Xu Lu, Xi'an (CN); Mingyu Yao, Xi'an (CN); Zaisong Yu, Xi'an (CN); Jihong Zhang, Xi'an (CN)

(73) Assignee: XI'AN THERMAL POWER RESEARCH INSTITUTE CO., LTD, Xi'an (CN)

( * ) Notice: Subject to any disclaimer, the term of this patent is extended or adjusted under 35 U.S.C. 154(b) by 0 days.

(21) Appl. No.: 18/446,171

(22) Filed: Aug. 8, 2023

(65) Prior Publication Data

US 2023/0383997 A1 Nov. 30, 2023

Related U.S. Application Data

(63) Continuation of application No. PCT/CN2022/102080, filed on Jun. 28, 2022.

(30) Foreign Application Priority Data

Nov. 5, 2021 (CN) .......................... 202111308733.8

(51) Int. Cl.
*F24S 23/71* (2018.01)
*F24S 60/00* (2018.01)
(Continued)

(52) U.S. Cl.
CPC ............... *F24S 23/71* (2018.05); *F24S 60/00* (2018.05); *H02S 40/22* (2014.12); *H02S 40/425* (2014.12); *H02S 40/44* (2014.12)

(58) Field of Classification Search
USPC ........................................................ 126/684
See application file for complete search history.

(56) References Cited

U.S. PATENT DOCUMENTS 3,927,659 A * 12/1975 Blake ........................ F22B 1/00
126/684
4,212,290 A * 7/1980 Warnken ................. F24S 23/70
126/684

(Continued)

FOREIGN PATENT DOCUMENTS

| CN | 105182549 A | 12/2015 |
| CN | 109687823 A | 4/2019 |

(Continued)

OTHER PUBLICATIONS

ISR for PCT application PCT/CN2022/102080.
(Continued)

*Primary Examiner* — Jorge A Pereiro
(74) *Attorney, Agent, or Firm* — Maginot, Moore & Beck, LLP

(57) ABSTRACT

A light-splitting reflection high-concentration photovoltaic photothermal integrated cavity receiver includes a photothermal assembly and a photovoltaic assembly. The photothermal assembly includes a high-temperature heat storage system, a low-temperature heat storage system, a plurality of heat exchange tube bundles defining a reflective cavity, and an ultraviolet and visible light reflective film arranged on an inner surface of the reflective cavity. The plurality of heat exchange tube bundles are communicated to form a heat collection circuit, and the heat collection circuit has an input end connected with the low-temperature heat storage system, and an output end connected with the high-temperature heat storage system. The photovoltaic assembly is arranged at a focus of the reflective cavity, and includes a near-infrared reflective film, a high concentration photovoltaic (Continued)

integrated receiver and a concentration photovoltaic cooler stacked sequentially along an incident direction of light.

9 Claims, 2 Drawing Sheets

(51) Int. Cl.
*H02S 40/22* (2014.01)
*H02S 40/42* (2014.01)
*H02S 40/44* (2014.01)

(56) References Cited

U.S. PATENT DOCUMENTS

| | | | | |
|---|---|---|---|---|
| 4,249,515 | A * | 2/1981 | Page | F24S 30/425 |
| | | | | 126/573 |
| 4,513,731 | A * | 4/1985 | Campbell | F24S 10/72 |
| | | | | 126/646 |
| 4,815,443 | A * | 3/1989 | Vrolyk | F24S 23/81 |
| | | | | 126/696 |
| 5,280,557 | A * | 1/1994 | Nwasokwa | F24S 23/70 |
| | | | | 126/684 |
| 7,638,708 | B2 * | 12/2009 | Fork | H01L 31/0547 |
| | | | | 136/246 |
| 7,851,693 | B2 * | 12/2010 | Fork | H01L 31/0547 |
| | | | | 136/246 |
| 8,546,686 | B2 * | 10/2013 | Ashkin | G02B 17/004 |
| | | | | 136/246 |
| 2004/0118449 | A1 * | 6/2004 | Murphy | F24S 60/30 |
| | | | | 136/246 |
| 2009/0283144 | A1 * | 11/2009 | Hebrink | G02B 1/105 |
| | | | | 136/259 |
| 2010/0139739 | A1 * | 6/2010 | Ashkin | G02B 17/004 |
| | | | | 136/246 |
| 2012/0138047 | A1 * | 6/2012 | Ashkin | F24S 30/452 |
| | | | | 126/684 |
| 2014/0290915 | A1 * | 10/2014 | Koppikar | F24D 17/0015 |
| | | | | 165/104.31 |
| 2016/0068703 | A1 * | 3/2016 | Schmidt | C08K 3/22 |
| | | | | 427/407.1 |

FOREIGN PATENT DOCUMENTS

| | | | | |
|---|---|---|---|---|
| CN | 113945015 A | | 1/2022 | |
| DE | 102011055311 A1 * | | 5/2013 | B29C 45/1704 |
| EP | 0632507 A2 * | | 1/1995 | |
| JP | 2017503467 A * | | 1/2017 | |
| WO | WO-2010054429 A1 * | | 5/2010 | F24J 2/07 |

OTHER PUBLICATIONS

English translation of ISR for PCT application PCT/CN2022/102080.
OA for CN application 202111308733.8.
English translation of OA for CN application 202111308733.8.

* cited by examiner

LIGHT-SPLITTING REFLECTION HIGH-CONCENTRATION PHOTOVOLTAIC PHOTOTHERMAL INTEGRATED CAVITY RECEIVER

CROSS REFERENCE TO RELATED APPLICATIONS

The present application is a continuation of International Application No. PCT/CN2022/102080, filed on Jun. 28, 2022, which claims the benefit of and priority to Chinese Application No. 202111308733.8, filed on Nov. 5, 2021, the entire disclosures of which are incorporated herein by reference.

FIELD

The present disclosure relates to a field of solar power generation, and more particularly to a light-splitting reflection high-concentration photovoltaic photothermal integrated cavity receiver.

BACKGROUND

The high concentration photovoltaic assembly can withstand a concentration ratio more than 1000 in theory, but under the influence of its material and structure, the efficiency of the concentration photovoltaic cell is significantly reduced at a high temperature, and the concentration photovoltaic cell also tends to be damaged. The temperature rise of the concentration photovoltaic cell is caused mainly by the thermal radiation of the light in the band above the near-infrared light in the solar rays, and the photoelectric conversion efficiency of this thermal radiation is not high, so that this thermal radiation cannot be effectively absorbed by the photovoltaic cell. Therefore, the conventional high concentration photovoltaic system cannot make full use of the conversion ability of the concentration ratio of the gallium arsenide cell, and its heat collection has a low grade, thus resulting in a poor utilizability. Because of the conflict between concentrated power generation and high-temperature heat collection, the light energy cannot be made full use of, which leads to low light utilization efficiencies of the two systems, and hence cannot provide further improvements.

SUMMARY

Embodiments of the present disclosure provide a light-splitting reflection high-concentration photovoltaic photothermal integrated cavity receiver. The receiver includes a photothermal assembly and a photovoltaic assembly. The photothermal assembly includes a high-temperature heat storage system, a low-temperature heat storage system, a plurality of heat exchange tube bundles defining a reflective cavity, and an ultraviolet and visible light reflective film arranged on an inner surface of the reflective cavity. The plurality of heat exchange tube bundles are communicated to form a heat collection circuit, and the heat collection circuit has an input end connected with the low-temperature heat storage system, and an output end connected with the high-temperature heat storage system. The photovoltaic assembly is arranged at a focus of the reflective cavity, and includes a near-infrared reflective film, a high concentration photovoltaic integrated receiver and a concentration photovoltaic cooler stacked sequentially along an incident direction of light.

DETAILED DESCRIPTION

The present disclosure will be further described in detail below with reference to specific embodiments, which are intended to explain but not to limit the present disclosure.

Figure 1:
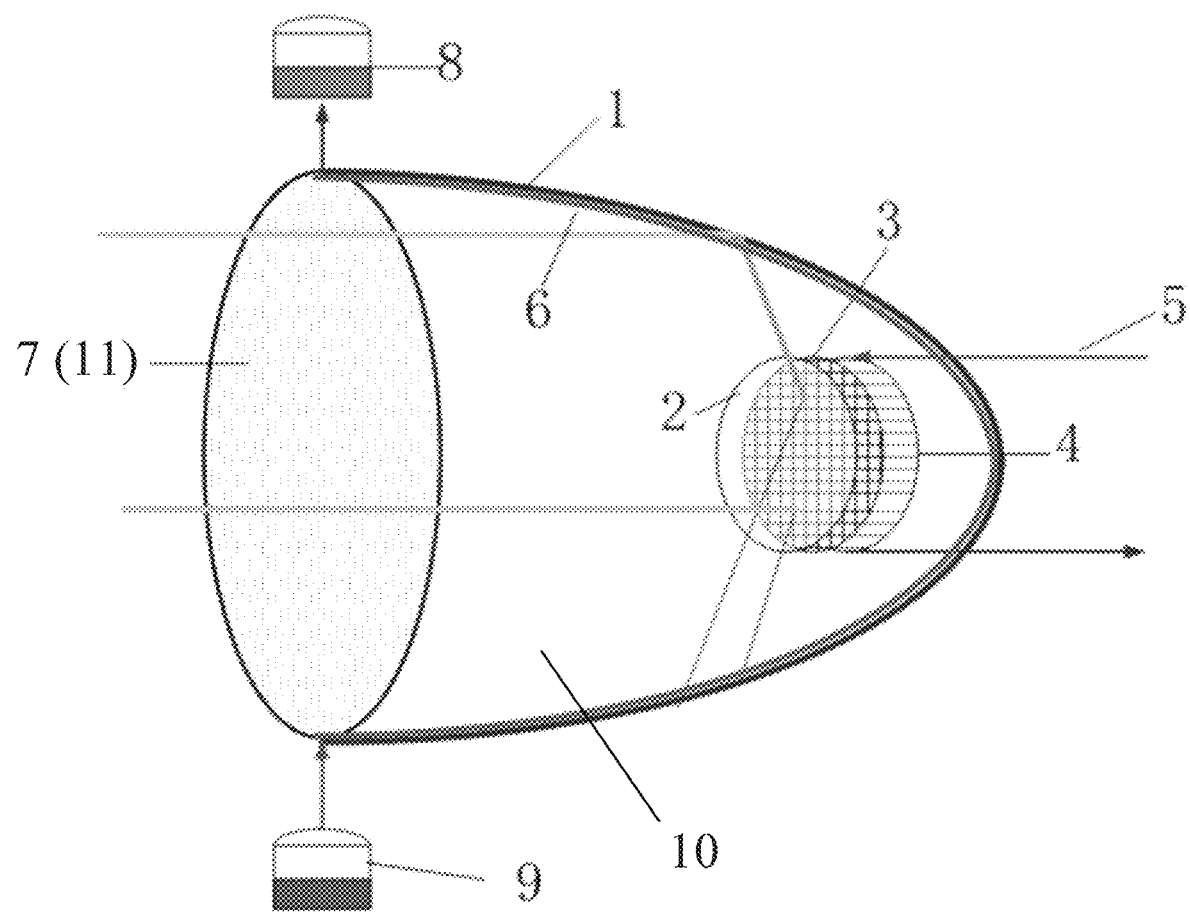
FIG. 1 is a schematic view of a light-splitting reflection high-concentration photovoltaic photothermal integrated cavity receiver according to an embodiment of the present disclosure.

The present disclosure relates to a light-splitting reflection high-concentration photovoltaic photothermal integrated cavity receiver. As shown in FIG. 1, the receiving device includes a heat collection circuit 1, a near-infrared reflective film 2, a high concentration photovoltaic integrated receiver 3, a concentration photovoltaic cooler 4, a cooling medium 5, an ultraviolet and visible light reflective film 6, a light-transmitting and sealing cover 7, a high-temperature heat storage system 8, a low-temperature heat storage system 9 and a reflective cavity 10.

Figure 3:
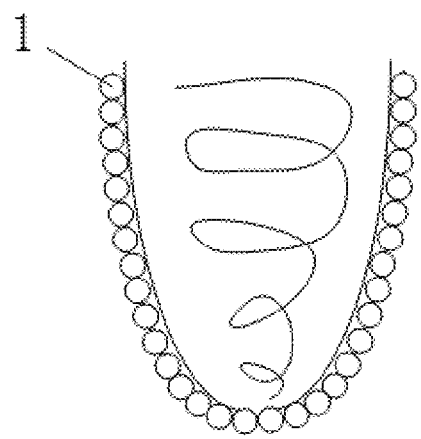
FIG. 3 is a schematic view of a heat collection circuit according to an embodiment of the present disclosure, in which a parabolic reflective cavity is formed by a single-path annular heat exchange tube bundle.
Figure 4:
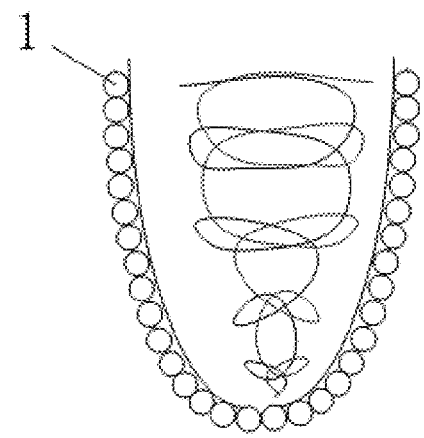
FIG. 4 is a schematic view of a heat collection circuit according to an embodiment of the present disclosure, in which a parabolic reflective cavity is formed by a double-path annular heat exchange tube bundle.
Figure 5:
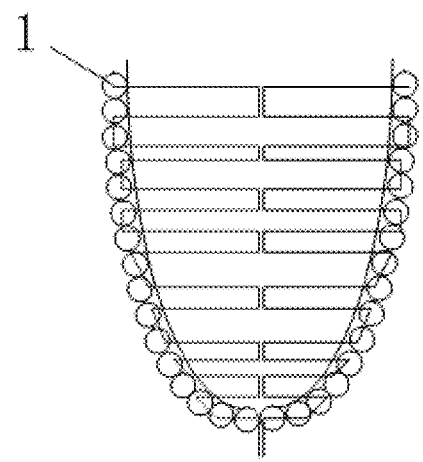
FIG. 5 is a schematic view of a heat collection circuit according to an embodiment of the present disclosure, in which a polyhedral reflective cavity is formed by a plurality of heat exchange tube bundle panels and the heat exchange tube bundle panel has a shape in which a hollow square is encircled with another hollow square.

The high-temperature heat storage system 8, the low-temperature heat storage system 9, and the reflective cavity 10 formed by a plurality of heat exchange tube bundles constitute a photothermal assembly. The ultraviolet and visible light reflective film 6 is arranged on an inner surface of the reflective cavity 10, and the reflective cavity 10 adopts a parabolic rotary reflective cavity or a polyhedral reflective cavity. The parabolic rotary reflective cavity is formed by winding a single-path annular heat exchange tube bundle or a double-path annular heat exchange tube bundle, and the polyhedral reflective cavity is formed by a plurality of heat exchange tube bundle panels which are externally tangent to a parabolic rotator and communicated with each other. The heat exchange tube bundle panel has a shape in which a hollow square is encircled with another hollow square. The parabolic rotator may be used when the plurality of heat exchange tube bundle panels are assembled, and may be removed subsequently so that the polyhedral reflective cavity can be formed and defined by the plurality of heat exchange tube bundle panels. The plurality of heat exchange tube bundles are communicated to form the heat collection circuit 1. As shown in FIGS. 3, 4 and 5, the heat collection circuit 1 includes the single-path or double-path annular heat exchange tube bundle or the plurality of tube bundle panels having the above shape, which form a parabolic cavity or a square cavity. As shown in FIG. 1, a tube bundle inlet of the heat collection circuit 1 is connected with the low-temperature heat storage system 9, and a tube bundle outlet of the heat collection circuit 1 is connected with the high-temperature heat storage system 8. The ultraviolet and visible light reflective film 6 is connected with an inner surface of the heat collection circuit 1 through a thermal insulation bracket. An opening 11 of the reflective cavity 10 is sealed by the light-transmitting and sealing cover 7.

Figure 2:
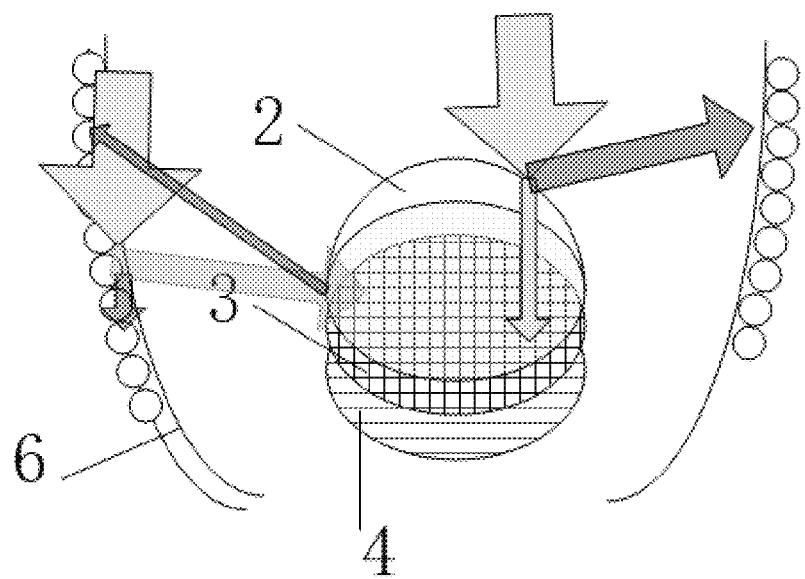
FIG. 2 is a schematic view of a receiver lamination composed of a near-infrared reflective film, a high concentration photovoltaic integrated receiver and a concentration photovoltaic cooler stacked according to an embodiment of the present disclosure.

As shown in FIG. 2, the near-infrared reflective film 2, the high concentration photovoltaic integrated receiver 3, and the concentration photovoltaic cooler 4 constitute a photovoltaic assembly, and the photovoltaic assembly is arranged at a focus of the reflective cavity 10. The near-infrared reflective film 2, the high concentration photovoltaic integrated receiver 3 and the concentration photovoltaic cooler 4 are stacked sequentially along an incident direction of light to constitute a receiver lamination. The receiver lamination is arranged at the focus inside the reflective cavity 10, and a side of the near-infrared reflective film 2 faces the opening 11 of the reflective cavity 10. The near-infrared reflective film 2 can reflect most infrared rays to the inner surface (where the ultraviolet and visible light reflective film 6 is) of the reflective cavity 10 defined by the heat collection circuit 1 to heat the heat collection circuit 1. Most ultraviolet light and visible light can pass through the near-infrared reflective film 2 and irradiate on the high concentration photovoltaic integrated receiver 3 to generate electricity.

The low-temperature heat storage system 9 and the high-temperature heat storage system 8 may be storage tanks or solid heat storage systems. A heat collection medium (i.e. a heat storage medium) in the low-temperature heat storage system 9 is heated by the heat collection circuit 1 and then enters the high-temperature heat storage system 8 for storage, and the heat collection medium may be a hot water, a molten salt or a thermally conductive oil.

The high concentration photovoltaic integrated receiver 3 is an integral receiver composed of multijunction gallium arsenide high concentration photovoltaic cells.

The concentration photovoltaic cooler 4 may be one of a plate heat exchanger, a tube bundle heat exchanger and a printed circuit board microchannel heat exchanger, and is attached to the high concentration photovoltaic integrated receiver 3 through a thermally conductive adhesive.

The concentration photovoltaic cooler 4 contains the cooling medium 5 therein. The cooling medium 5 may be one of water, air, a thermally conductive oil and an organic working medium, and it flows through the concentration photovoltaic cooler 4 to cool the high concentration photovoltaic integrated receiver 3.

In the following, the principle or use of the device in the present disclosure will be explained in detail by referring to specific parameters of various structures in the device of the present disclosure.

As shown in FIG. 1, the light-splitting reflection high-concentration photovoltaic photothermal integrated cavity receiver is provided. The heat collection circuit 1 adopts a double-loop spiral coil, and has a material of 20G steel (i.e. boiler steel), a pipe diameter of an inlet medium temperature of 290° C. and an outlet medium temperature of 390° C. The near-infrared reflective film 2 has a cutoff wavelength of 900 nm. The high concentration photovoltaic integrated receiver 3 has a capacity of 1 MW. The concentration photovoltaic cooler 4 adopts a printed circuit board heat exchanger. The cooling medium 5 adopts the water, and has an inlet water temperature of 25° C. and an outlet water temperature of 80° C. The ultraviolet and visible light reflective film 6 has a cutoff wavelength of 900 nm. The light-transmitting and sealing cover 7 adopts an ultra-clear glass. The heat storage media in the high-temperature heat storage system 8 and the low-temperature heat storage system 9 are molten salts.

Assuming that 30% of the light enters the receiver lamination at the focus, the near-infrared light is reflected to an inner surface of the reflective cavity 10 by the near-infrared reflective film 2, 70% of the light irradiates on the ultraviolet and visible light reflective film 6 on the inner surface of the reflective cavity 10, and the ultraviolet light and the visible light are partially reflected to the receiver lamination at the focus. The near-infrared reflective film 2 has a reflectivity of 20% in a band below 900 nm and a reflectivity of 80% in a band above 900 nm. The ultraviolet and visible light reflective film 6 has a reflectivity of 80% in the band below 900 nm, and a reflectivity of 20% in the band above 900 nm. A direct normal irradiance (DNI) of a design point is 800 W/m$^2$, a concentration ratio is 1000, and an efficiency of a concentration photovoltaic cell is 37%.

A main absorption band of concentration photovoltaics is below 900 nm, so that a photoelectric conversion efficiency of the cell will not be affected in theory. In view of that the temperature of the cooling water is not higher than 80° C., the photovoltaic cell always works in a high-efficiency working condition. The present disclosure has the following comprehensive efficiency: the photoelectric conversion efficiency is above 30%, the photothermal conversion efficiency is above 60%, and the outlet medium temperature is 390° C., which can be used for high-temperature heat utilization or power generation.

The above parameters are used to illustrate the present disclosure, but cannot be used to limit the scope of the present disclosure.

In the present disclosure, the heat collection circuit and the ultraviolet and visible light reflective film are adopted to define the reflective cavity of the cavity receiver, and the receiver lamination composed of the near-infrared reflective film, the high concentration photovoltaic integrated receiver and the concentration photovoltaic cooler stacked sequentially is arranged at the focus of the reflective cavity. Through the separation and utilization of light by the near-infrared reflective film and the ultraviolet and visible light reflective film, the conflict between concentrated power generation and high-temperature heat collection of the high-concentration photovoltaic photothermal integrated system is addressed, so that the high-efficiency power generation spectrum band can be used to generate power through the high concentration photovoltaic integrated receiver, and the high-efficiency heat collection spectrum band can be used to collect heat through the heat collection circuit, the low-temperature heat storage system and the high-temperature heat storage system, which improves the overall efficiency of the system, and increases the grade of heat collection, so as to be further used for power generation or high-parameter heat utilization, thus improving the overall exergy efficiency of the system.

Further, the reflective cavity in the present disclosure is the parabolic rotary reflective cavity formed by winding the single-path annular heat exchange tube bundle or the double-path annular heat exchange tube bundle, which provides a simple structure, a reasonable design and a wide application range, and can effectively improve the heat collection efficiency of the system.

Further, the reflective cavity in the present disclosure is the polyhedral reflective cavity formed by the plurality of heat exchange tube bundle panels externally tangent to the parabolic rotator and communicated with each other, and the heat exchange tube bundle panel has the shape in which a hollow square is encircled with another hollow square, which provides a simple structure, a reasonable design and a wide application range, and can effectively improve the heat collection efficiency of the system.

Further, the ultraviolet and visible light reflective film is connected with the heat collection circuit through the thermal insulation bracket, which is safe and reliable, and can effectively ensure that the near-infrared reflective film reflects most infrared rays to the inner surface of the reflective cavity defined by the ultraviolet and visible light reflective film and the heat collection circuit to heat the heat collection circuit.

Further, the integral receiver composed of multijunction gallium arsenide high concentration photovoltaic cells serves as the high concentration photovoltaic integrated receiver, which provides a strong integrity, and further improves the efficiency of most ultraviolet light and visible light passing through the near-infrared reflective film and irradiating on the high concentration photovoltaic integrated receiver to generate power.

Further, the present disclosure realizes the cooling of the high concentration photovoltaic integrated receiver by providing the concentration photovoltaic cooler and the cooling medium, and various kinds of the concentration photovoltaic coolers and the cooling media can be adopted, which provides a wide application range and a good cooling effect, and effectively improves the safety, reliability and overall efficiency of the system.

Further, the present disclosure adopts the low-temperature heat storage system and the high-temperature heat storage system to realize the heat collection, that is, various heat storage media in the low-temperature heat storage system are heated by the heat collection circuit and then enter the high-temperature heat storage system to be stored, which provides a reasonable design, is simple and efficient, and effectively improves the heat collection efficiency of the system.

Further, the device is sealed by the light-transmitting and sealing cover, which can improve the safety of the whole system and ensure the power generation and heat collection efficiencies of the system.

The above description only relates to the preferred embodiment of the present disclosure, and is not intended to limit the present disclosure. Any modification, equivalent substitution and improvement made within the spirit and principle of the present disclosure should be included in the scope of the present disclosure.

What is claimed is:

1. A light-splitting reflection high-concentration photovoltaic photothermal integrated cavity receiver, comprising a photothermal assembly and a photovoltaic assembly,
wherein the photothermal assembly comprises a high-temperature heat storage system, a low-temperature heat storage system, a plurality of heat exchange tube bundles defining a reflective cavity, and an ultraviolet and visible light reflective film arranged on an inner surface of the reflective cavity, the ultraviolet and visible light reflective film having less reflectivity than transmittance for light with a wavelength greater than 900 nm, the plurality of heat exchange tube bundles are communicated to form a heat collection circuit, and the heat collection circuit has an input end connected with the low-temperature heat storage system, and an output end connected with the high-temperature heat storage system,
wherein the photovoltaic assembly is arranged at a focus of the reflective cavity, and comprises a near-infrared reflective film, a high concentration photovoltaic integrated receiver and a concentration photovoltaic cooler stacked sequentially along an incident direction of light;
wherein the high concentration photovoltaic integrated receiver is an integral receiver composed of multijunction gallium arsenide high concentration photovoltaic cells.

2. The light-splitting reflection high-concentration photovoltaic photothermal integrated cavity receiver according to claim 1, wherein the reflective cavity is a parabolic rotary reflective cavity, and the parabolic rotary reflective cavity is defined by a wound single-path annular heat exchange tube bundle or a wound double-path annular heat exchange tube bundle.

3. The light-splitting reflection high-concentration photovoltaic photothermal integrated cavity receiver according to claim 1, wherein the reflective cavity is a polyhedral reflective cavity, the polyhedral reflective cavity is defined by a plurality of heat exchange tube bundle panels externally tangent to a parabolic rotator and communicated with each other, and a tube flow path of the heat exchange tube bundle panel has a shape approximating a hollow square encircled with another hollow square.

4. The light-splitting reflection high-concentration photovoltaic photothermal integrated cavity receiver according to claim 1, wherein the ultraviolet and visible light reflective film is connected with an adjacent heat exchange tube bundle through a thermal insulation bracket.

5. The light-splitting reflection high-concentration photovoltaic photothermal integrated cavity receiver according to claim 1, wherein the concentration photovoltaic cooler is attached to the high concentration photovoltaic integrated receiver through a thermally conductive adhesive.

6. The light-splitting reflection high-concentration photovoltaic photothermal integrated cavity receiver according to claim 1, wherein the concentration photovoltaic cooler comprises one of a plate heat exchanger, a tube bundle heat exchanger and a printed circuit board microchannel heat exchanger.

7. The light-splitting reflection high-concentration photovoltaic photothermal integrated cavity receiver according to claim 1, wherein the concentration photovoltaic cooler contains a cooling medium therein, and the cooling medium comprises one of water, air, a thermally conductive oil and an organic working medium.

8. The light-splitting reflection high-concentration photovoltaic photothermal integrated cavity receiver according to claim 1, wherein each of the low-temperature heat storage system and the high-temperature heat storage system is configured as one of a storage tank and a solid heat storage system, and a heat storage medium in each of the low-temperature heat storage system and the high-temperature heat storage system comprises one of a hot water, a molten salt and a thermally conductive oil.

9. The light-splitting reflection high-concentration photovoltaic photothermal integrated cavity receiver according to claim 1, further comprising a light-transmitting and sealing cover arranged at an opening of the reflective cavity.

* * * * *